United States Patent
Park

(10) Patent No.: US 9,971,028 B2
(45) Date of Patent: May 15, 2018

(54) METHOD AND APPARATUS FOR DETECTING TARGET USING RADAR

(71) Applicant: ELECTRONICS AND TELECOMMUNICATIONS RESEARCH INSTITUTE, Daejeon (KR)

(72) Inventor: Ki Hyuk Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 464 days.

(21) Appl. No.: 14/608,406

(22) Filed: Jan. 29, 2015

(65) Prior Publication Data

US 2015/0226848 A1 Aug. 13, 2015

(30) Foreign Application Priority Data

Feb. 11, 2014 (KR) .................. 10-2014-0015283

(51) Int. Cl.
*G01S 13/42* (2006.01)
*G01S 13/58* (2006.01)
(Continued)

(52) U.S. Cl.
CPC .......... *G01S 13/584* (2013.01); *G01S 7/354* (2013.01); *G01S 13/345* (2013.01); *G01S 13/931* (2013.01); *G01S 2007/358* (2013.01)

(58) Field of Classification Search
CPC ...... G01S 13/584; G01S 7/354; G01S 13/345; G01S 13/931; G01S 2007/358;
(Continued)

(56) References Cited

U.S. PATENT DOCUMENTS 5,019,825 A * 5/1991 McCorkle ............... G01S 13/28
342/201
5,389,933 A * 2/1995 Golinsky ................ G01S 7/023
342/201
(Continued)

FOREIGN PATENT DOCUMENTS

KR 10-0886437 B1 3/2009
KR 101185480 B1 * 10/2012
KR 101185480 B1 * 10/2012 ............. G01S 13/34

OTHER PUBLICATIONS

Desmond Kok et al., "Signal Processing for Automotive Radar", 0-7803-8882-8/05, 2005 IEEE, Singapore.

*Primary Examiner* — Peter M Bythrow
*Assistant Examiner* — Nuzhat Pervin
(74) *Attorney, Agent, or Firm* — LRK Patent Law Firm

(57) ABSTRACT

Provided is a method and apparatus for detecting a target using radar, the apparatus including a transmitter to generate a frequency modulated continuous waveform (FMCW) of a baseband, convert the FMCW into a signal of a predetermined frequency band, and emit the signal to a target through radar, a receiver to receive the signal reflected from the target through each antenna of a multi-array antenna, and estimate information on the target based on the signal received through each antenna, and a processor to control operations of the transmitter and the receiver.

17 Claims, 13 Drawing Sheets

(51) Int. Cl.
  *G01S 13/93* (2006.01)
  *G01S 7/35* (2006.01)
  *G01S 13/34* (2006.01)
(58) Field of Classification Search
  CPC ........ G01S 13/34; G01S 13/26; G01S 13/343; G01S 13/583; G01S 7/023; G01S 7/35; G01S 7/021; G01S 7/352; G01S 3/14; G01S 13/325; B60K 31/0008
  USPC .......................................................... 342/70
  See application file for complete search history.

(56) References Cited

U.S. PATENT DOCUMENTS

| | | | | |
|---|---|---|---|---|
| 6,606,052 B1* | 8/2003 | Miyahara | ............. | G01S 13/343 342/107 |
| 7,071,868 B2* | 7/2006 | Woodington | ...... | B60K 31/0008 342/112 |
| 7,394,422 B2* | 7/2008 | Nohmi | ...................... | G01S 7/35 342/107 |
| 7,436,348 B2* | 10/2008 | Nohmi | ...................... | G01S 7/35 342/159 |
| 7,791,530 B2* | 9/2010 | Puglia | .................... | G01S 7/352 342/128 |
| 8,599,062 B2* | 12/2013 | Szajnowski | ............. | G01S 7/023 342/104 |
| 8,786,489 B2* | 7/2014 | Patrick | ...................... | G01S 3/14 342/133 |
| 9,013,347 B2* | 4/2015 | Park | ...................... | G01S 13/584 342/104 |
| 9,541,638 B2* | 1/2017 | Jansen | .................. | G01S 13/343 |
| 2009/0278727 A1* | 11/2009 | Inaba | ...................... | G01S 7/021 342/112 |

* cited by examiner

900

METHOD AND APPARATUS FOR DETECTING TARGET USING RADAR

CROSS-REFERENCE TO RELATED APPLICATION

This application claims the priority benefit of Korean Patent Application No. 10-2014-0015283, filed on Feb. 11, 2014, in the Korean Intellectual Property Office, the disclosure of which is incorporated herein by reference.

BACKGROUND

1. Field of the Invention

Embodiments of the present invention relate to a target detection method and apparatus for detecting a range, a velocity, and an azimuth of a target using radar.

2. Description of the Related Art

Recently, an increasing number of vehicles are equipped with various vehicular active safety systems to protect drivers and reduce a rate at which accidents occur. A radar sensor, a type of sensor for recognizing an external situation, is widely used for the vehicular active safety system. The radar sensor has a functional strength in an external environment and weather conditions when compared to other sensors for recognizing the external situation.

In general, among various radar modulation schemes, a frequency modulated continuous waveform (FMCW) scheme performed in 77 gigahertz (GHz) band may be widely used due to a convenience in manufacturing and an outstanding function of detecting vehicular information. Radar using the FMCW scheme may transmit a chirp signal of which a frequency is linearly modulated, and measure a range and velocity of a target vehicle. Also, the radar using the FMCW may modulate the frequency into a form of a sawtooth wave, or transmit a waveform obtained by modulating the frequency into a triangular wave having a form of rising-frequency chirp and falling-frequency chirp.

SUMMARY

An aspect of the present invention provides a target detection apparatus in an efficient hardware configuration having an increased target detection performance of supporting short range radar and long range radar, and a target detection method.

According to an aspect of the present invention, there is provided a target detection apparatus including a transmitter to generate a frequency modulated continuous waveform (FMCW) of a baseband, convert the FMCW into a signal of a predetermined frequency band, and emit the signal to a target through radar, a receiver to receive the signal reflected from the target through each antenna of a multi-array antenna, and estimate information on the target based on the signal received through each antenna, and a processor to control operations of the transmitter and the receiver.

The transmitter may include an FMCW generator to generate the FMCW of the baseband, and a radio frequency (RF) transmitter to convert the FMCW into the signal of the predetermined frequency band, and emit the signal through the radar.

The processor may receive a chirp number of a chirp to be transmitted by the transmitter and an interrupt signal indicating a start point of each chirp section of the FMCW from a radar signal processor of the receiver and then provide a control signal allowing the FMCW generator to generate a FMCW of a corresponding section.

The FMCW generator may generate the FMCW of the corresponding section under a control of the processor and transfers an output valid signal indicating that the FMCW of the corresponding section is being outputting, to the radar signal processor.

The radar signal processor may perform a radar signal processing by acquiring a start point of a valid radar reception signal based on the output valid signal provided from the FMCW generator as a synchronization signal.

The radar signal processor may inform the processor of the start point of each chirp section in the FMCW as an interrupt, and inform the FMCW generator of the chirp number of the chirp to be transmitted by the transmitter.

All or part of functions of the radar signal processor may be processed by the processor through software.

In the FMCW, a first waveform for detecting a short range target and a second waveform for detecting a long range target may occur sequentially during one cycle.

The first waveform may include five chirps, each having a different time-based frequency change inclination.

The second waveform may include seven chirps, each having a different time-based frequency change inclination.

The receiver may calculate a beat frequency for each segment based on the signal received through each antenna, and estimate information including a range, a velocity, and an azimuth of the target.

The receiver may include a multi-array antenna including a plurality of antennas receiving signals reflected from the target, RF receivers to convert the signals received through the antennas of the multi-array antenna, into complex signals of the baseband, analog-to-digital converters (ADCs) to convert the complex signals into digital signals, and a radar signal processor to process the digital signals and estimate information on the target.

Each of the RF receivers may multiply the signal of the predetermined frequency band provided by the transmitter, by the signals received by the respective antennas, and convert results of the multiplying into the complex signals of the baseband.

A number of ADCs may be proportional to a number of antennas included in the multi-array antenna.

The radar signal processor may include an ADC symbol formatter to segment serial bits input from the ADCs based on a unit of an ADC symbol, and output the ADC symbol through a rearrangement based on an arrangement order of the antennas, a direct current (DC) offset remover to remove a DC component from the rearranged ADC symbol, a first window to apply a window function to degrade a side-lobe level of an interference signal with respect to the ADC symbol from which the DC component is removed, a digital beam former (DBF) to combine the signals received through the antennas to be signals received in a predetermined direction through a digital operation based on an output signal of the first window, and output the combined signals for each beam, a second window to apply a window function to reduce a leakage error occurring during a fast Fourier transform (FFT) performed on the combined signals, a fast Fourier transformer to perform the FFT on an output signal of the second window, a constant false alarm rate (CFAR) detector to select predetermined beat frequencies by applying a variable detection threshold to an output signal of the FFT, an estimator to estimate information including a range, a velocity, and an azimuth of the target from the selected beat frequencies, and a chirp counter to calculate a chirp number and a start point of each chirp section in the FMCW.

The DBF may multiply the output signal through each antenna of the first window by a preset weighted value and combine a signal received in a predetermined direction through a phase rotation.

According to another aspect of the present invention, there is also provided a receiver in a target detection apparatus, the receiver including a multi-array antenna including a plurality of antennas receiving signals reflected from a target, RF receivers to convert the signals received through the antennas of the multi-array antenna, into complex signals of a baseband, ADCs to convert the complex signals of the baseband into digital signals, and a radar signal processor to calculate predetermined beat frequencies based on the digital signals, and estimate information on the target based on the calculated beat frequencies.

According to still another aspect of the present invention, there is also provided a target detection method including generating an interrupt requesting for a generation of an FMCW, setting values for use in the generation of the FMCW in an FMCW generator, generating an FMCW of a baseband, converting the FMCW into a signal of a predetermined frequency band and emitting the signal to a target through radar, receiving the signal reflected from the target, through each antenna of a multi-array antenna during a valid output section of a transmitter, calculating predetermined beat frequencies based on the signal received through each antenna, and estimating information on the target based on the calculated beat frequencies.

The selecting may include converting the signal received through each antenna of the multi-array antenna, into complex signals of the baseband, converting the complex signals of the baseband into a digital signal, and selecting the predetermined beat frequencies by processing the digital signals.

The selecting may include segmenting serial bits of the digital signals based on a unit of an ADC symbol, and rearranging the ADC symbol based on an arrangement order of antennas, removing a DC component from the rearranged ADC symbol, applying a first window function to degrade a side-lobe level of an interference signal with respect to the ADC symbol from which the DC component is removed, combining signals received through each antenna based on a result of the applying of the first function, applying a second window function to reduce a leakage error occurring during an FFT performed on the combined signals, performing the FFT on a result of the applying of the second window, and selecting predetermined beat frequencies by applying a variable detection threshold to a result of the performing.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
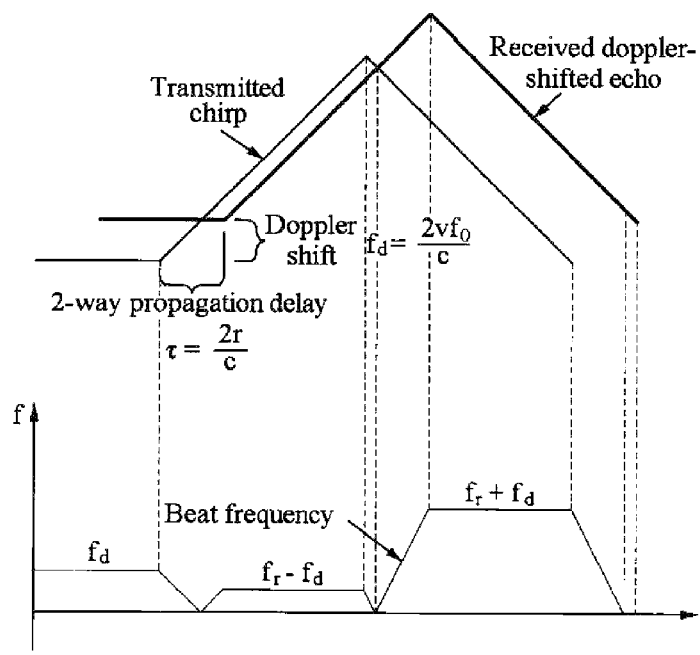
FIG. 1 is a diagram illustrating a relationship among a transmitted wave, a reflected wave, and a beat frequency in a case in which a front target approaches according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a relationship among a transmitted wave, a reflected wave, and a beat frequency in a case in which a front target approaches according to a related art.

Forms of the beat frequency, the reflected wave, and the transmitted wave provided when the front target approaches are indicated with reference to FIG. 1.

In a radar system based on a continuous waveform frequency modulation scheme, a beat frequency $f_b$ may be estimated to extract information from a signal reflected from an object, for example, a target. Since a range and velocity-based frequency is to be identified to detect a moving or stationary object and acquire a velocity of the object, beat spectrum estimation may be significantly performed at a receiving end. At the receiving end, a Doppler spectrum may be analyzed based on the range, thereby extracting information on the range and the velocity of the target.

The beat frequency $f_b$ may refer to a difference between a frequency $f_{tx}$ of the transmitted wave and a frequency $f_{rx}$ of the reflected wave as shown in Equation 1.

$$f_b = |f_{tx} - f_{rx}| \qquad \text{[Equation 1]}$$

In Equation 1, the frequency $f_{tx}$ of the transmitted wave may be a frequency of a transmitted chirp, and the frequency $f_{rx}$ of the reflected wave may be a frequency of a received echo signal.

In this example, a Doppler frequency $f_d$ and a frequency value $f_r$ varying based on the range of the target may be expressed by Equation 2.

$$f_{b,up} = |f_r - f_d|, \ f_{b,down} = |f_r + f_d| \quad \text{[Equation 2]}$$

$$f_r = \frac{f_{b,down} + f_{b,up}}{2}$$

$$f_d = \frac{f_{b,down} - f_{b,up}}{2}$$

In Equation 2, $f_{b,up}$ denotes a beat frequency in a rising-frequency chirp, and $f_{b,down}$ denotes a beat frequency in, a falling-frequency chirp.

Thus, at the receiving end, a velocity V and a range R of the target may be obtained using Equation 3 based on the Doppler frequency $f_d$ and the frequency value $f_r$ varying based on the range of the target.

$$V = \frac{c \cdot f_d}{2 \cdot f_c} \ R = \frac{c \cdot T \cdot f_r}{2 \cdot B} \quad \text{[Equation 3]}$$

In Equation 3, c denotes a propagation velocity, T denotes a sweep time, and B denotes a modulated bandwidth.

Figure 2:
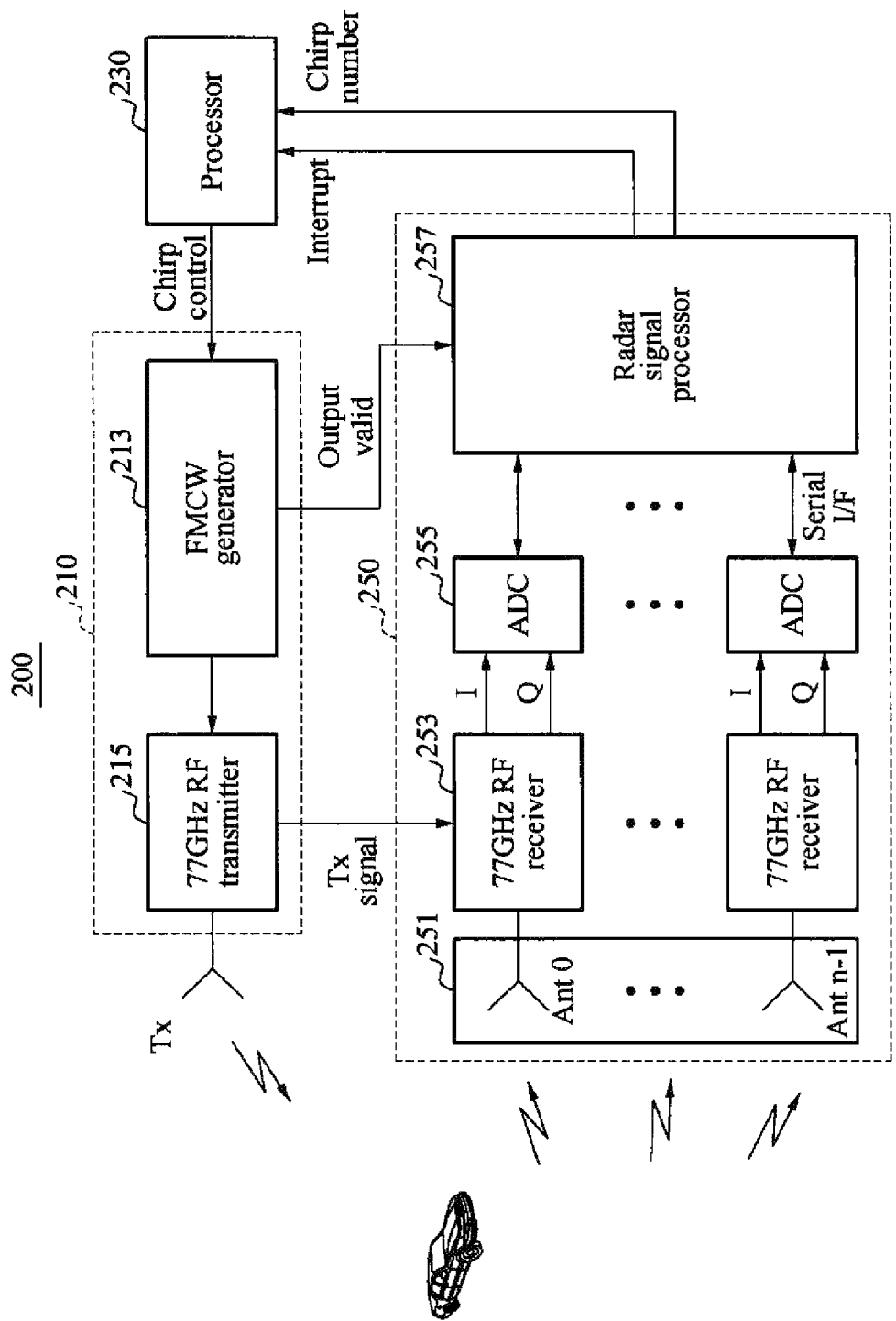
FIG. 2 is a block diagram illustrating a target detection apparatus using radar according to an example embodiment.

FIG. 2 is a block diagram illustrating a target detection apparatus 200 using, radar according to an example embodiment.

Referring to FIG. 2, the target detection apparatus 200 includes a transmitter 210, a processor 230, and a receiver 250.

The transmitter 210 may generate a frequency modulated continuous waveform (FMCW) of a baseband, convert the FMCW into a signal of a predetermined frequency band, for example, a 77 gigahertz (GHz)-band, and emit the signal of the predetermined frequency band to a target.

The transmitter 210 includes an FMCW generator 213 and a radio frequency (RF) transmitter 215.

The processor 230 may perform a function to control operations of the transmitter 210 and the receiver 250.

The processor 230 may provide a start signal to the FMCW generator 213 of the transmitter 210, and provide a synchronization (sync) signal indicating a start point of each chirp interval of the FMCW, to the receiver 250.

The FMCW generator 213 may generate the FMCW of the baseband. The FMCW generator 213 may generate, for example, an FMCW of which a frequency is modulated as described in FIG. 3. Descriptions about the FMCW generated by the FMCW generator 213 will be provided with reference to FIG. 3.

The RF transmitter 215 may convert the FMCW generated by the FMCW generator 213, into the signal of the predetermined frequency band, for example, the 77 GHz-band. The signal of the predetermined frequency band may be emitted to the target through transmission radar.

The emitted FMCW may be reflected from the target, and received by a multi-array antenna 251 of the receiver 250.

The receiver 250 may receive the reflected signal through each antenna of the multi-array antenna, and estimate information on the target, for example, a range, velocity, and an azimuth of the target, based on the received signal. Also, the receiver 250 may calculate a beat frequency for each segment based on the received signal, and estimate the information on the target based on the calculated beat frequency.

The receiver 250 includes the multi-array antenna 251, RF receivers including the RF receiver 253, analog-to-digital converters (ADCs) including an ADC 255, and a radar signal processor 257.

The multi-array antenna 251 includes a plurality of antennas receiving signals reflected from the target.

The RF receivers may convert the signals received through the antennas of the multi-array antenna 251, into complex signals of a baseband. In this example, the received signals may be multiplied by an FMCW transmission signal of the 77 GHz-band provided from the RF transmitter 215 and then converted into baseband complex signals, each having a channel I component and a channel Q component.

The ADCs may convert the baseband complex signals into digital signals. In this example, a number of the ADCs may be proportional to the number of antennas included in the multi-array antenna 251.

The radar signal processor 257 may process the digital signals to estimate the information on the target. The radar signal processor 257 may calculate the range, the velocity, and the azimuth of the target based on the digital signals converted by the ADCs. The radar signal processor 257 may be connected with the ADCs through a serial bus interface. Thus, the digital signals converted by the ADCs may be sequentially input to the radar signal processor 257 on a bit-by-bit basis.

Figure 3:
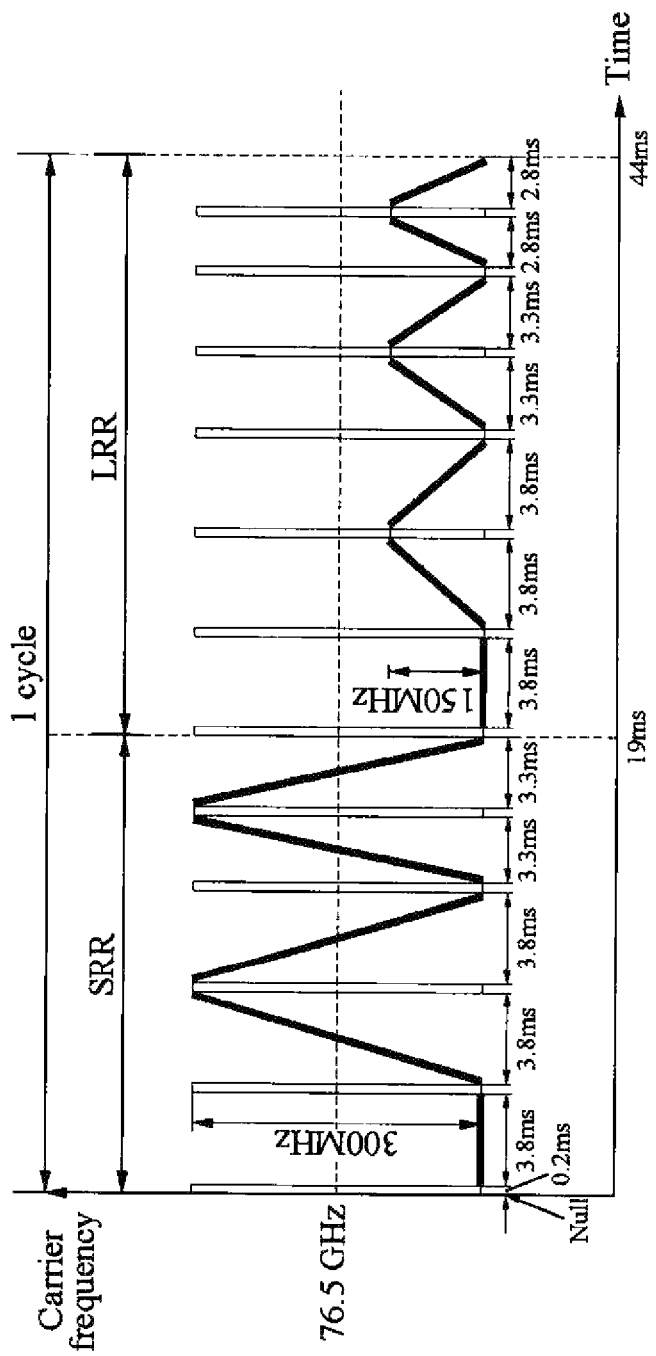
FIG. 3 is a diagram illustrating a frequency change occurring in one cycle of a frequency modulated continuous waveform (FMCW) used in a target detection apparatus according to an example embodiment.

FIG. 3 is a diagram illustrating a frequency change occurring during one cycle of an FMCW used in a target detection apparatus according to, an example embodiment.

Referring to FIG. 3, during one cycle of the FMCW, a waveform for detecting a short range target may occur in a short range mode, and a waveform for detecting a long range target may occur in a long range mode. In this example, the waveform for detecting the short range target and the waveform for detecting the long range target may occur sequentially.

In FIG. 3, the waveform for detecting the short range target may include five chirps, each having a different time-based frequency change inclination. The waveform for detecting the long range target may include seven chirps, each having a different time-based frequency change inclination.

A null section of FIG. 3 may be a time interval during which a processor controls a transmitter and a receiver before the FMCW is transmitted by the transmitter, and may have, for example, a value of 0.2 milliseconds (ms).

Figure 4:
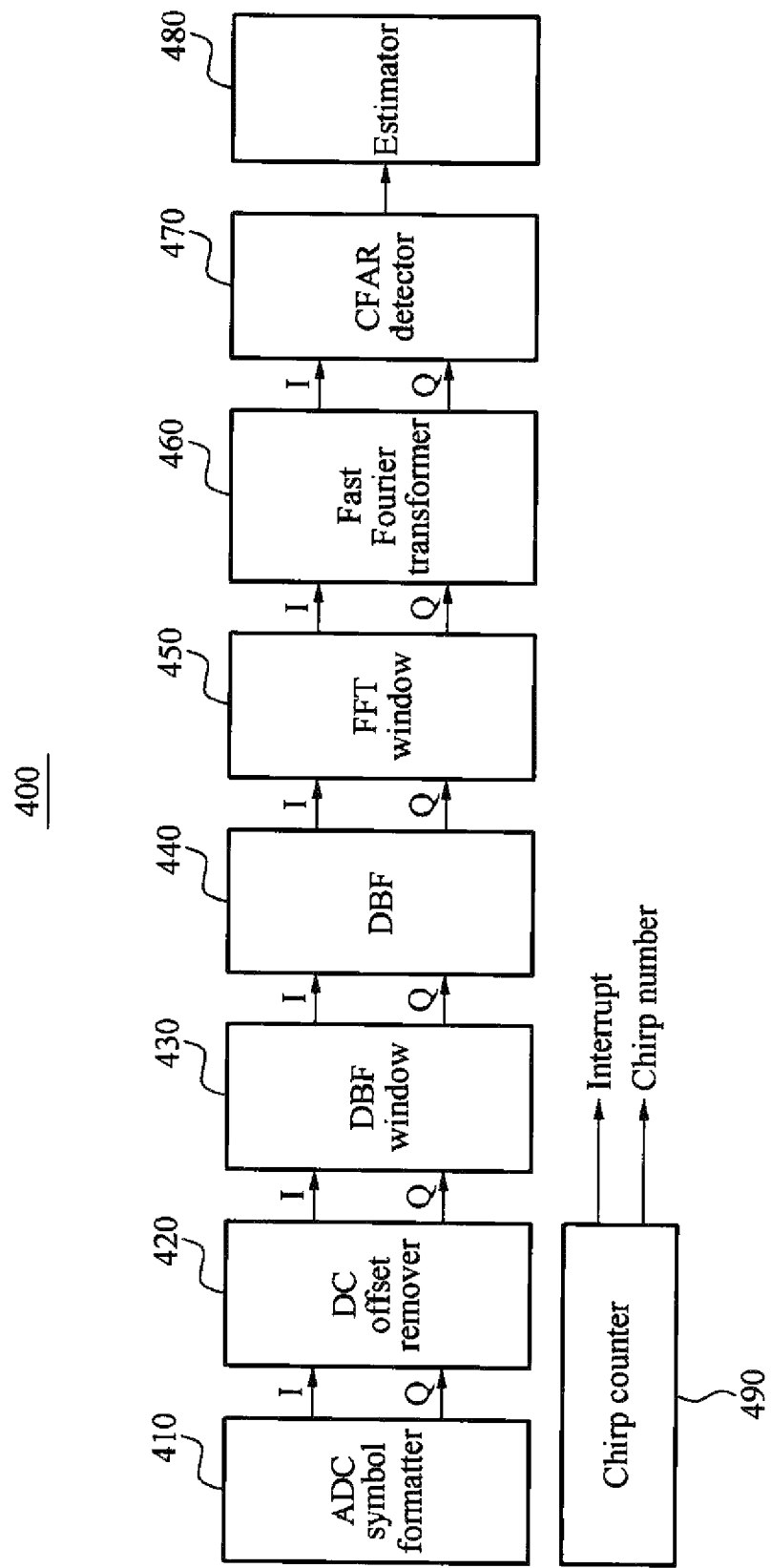
FIG. 4 is a block diagram illustrating a configuration of a radar signal processor in a target detection apparatus according to an example embodiment.

FIG. 4 is a block diagram illustrating a configuration of a radar signal processor 400 in a target detection apparatus according to an example embodiment. In this example, the radar signal processor 400 may correspond to the radar signal processor 257 of FIG. 2.

Referring to FIG. 4, the radar signal processor 400 includes an ADC symbol formatter 410, a DC offset remover 420, a first window 430, a digital beam former (DBF) 440, a second window 450, a fast Fourier transformer 460, a constant false alarm rate (CFAR) detector 470, and an estimator 480.

The ADC symbol formatter 410 may collect serial bits input from ADCs, segment the collected serial bits based on a unit of an ADC symbol, and output the ADC symbol through a rearrangement based on an arrangement order of antennas.

The DC offset remover 420 may remove a DC component from the ADC symbol rearranged by the ADC symbol formatter 410.

The first window 430 may apply a first window function to degrade a side-lobe level of an interference signal with respect to the ADC symbol from which the DC component is removed. The first window 430 may degrade the side-lobe level of the interference signal using the first window function, for example, a Hamming window, a Chebyshev window, and the like. The first window 430 may apply the first window function before a digital beam is formed by the DBF 440. Thus, the first window 430 may also be referred to as a DBF window.

Generally, in a radar system using a continuous waveform based on a frequency modulation scheme, a frequency transitioned for each range and an additional Doppler spectrum may need to be estimated to remotely detect a moving target, and a fast Fourier transform (FFT) scheme may be used to estimate a spectrum of a intermediate frequency band or a baseband for extracting a beat frequency.

Depending on a case, a dwell time provided to a radar antenna to acquire a reflected signal of a target object may be relatively short due to system characteristics. In this case, a performance degradation phenomenon may occur and thus, salient information on an adjacent signal may be obscured and undetectable due to an increased side-lobe of the interference signal.

For example, when a reception time of a reflected wave reflected from a target is relatively short, a side-lobe of a strong interference signal such as a clutter may be leaked to an adjacent Doppler filter and thus, a signal to be detected may be obscured. In this example, the clutter may refer to a reflection error, for example, an echo, caused by a reflected wave occurring in radar due to a ground surface, a sea surface, a raindrop, and the like.

According to an example embodiment, a beat frequency may be easily detected by degrading a side-lobe level of an interference signal based on various window functions.

The DBF 440 may combine the signals received through the antennas based on an output signal of the first window 430, and output the combined signals for each beam. The DBF 440 may multiply a gain by an output signal through each of the antennas using a preset weighted value, and combine a signal received in a predetermined direction through a phase rotation. For example, the DBF 440 may perform a digital operation with respect to the signal received through each of the antennas to perform a combination. The digital operation may refer to an operation of multiplying a phase to the signal received through each antenna. In this example, the preset weighted value may be a weighted value for the signal received through each of the antennas.

The second window 450 may apply a second window function to reduce a leakage error occurring during an FFT performed on the signal combined in the DBF 440.

The FFT may refer to a discrete Fourier transform and thus, in practice, may not receive data for a sufficient or unlimited time due to a limited memory. Thus, data in a frequency domain may have a discrete property. A discontinuous frequency may lead to an error between a time signal and an actual frequency on a spectrum. The error between the time signal and the actual frequency may also be referred to as a leakage error.

The second window 450 may reduce the leakage error based on the second window function, for example, the Hamming window, the Chebyshev window, and the like. The second window 450 may apply the second window function before the FFT is performed in the fast Fourier transformer 460 and thus, may also be referred to as an FFT window.

The fast Fourier transformer 460 may perform the FFT on an output signal of the second window 450.

The CFAR detector 470 may apply a variable detection threshold to an output signal of the fast Fourier transformer 460 and select predetermined beat frequencies. The CFAR detector 470 may perform a function to select a meaningful beat frequency by removing a clutter while constantly maintaining a false alarm rate by applying variable noise and a variable detection threshold in a clutter environment.

Based on a scheme of selecting a detection threshold, the CFAR detector 470 may use, for example, a cell-averaging CFAR (CA-CFAR), an order statistics CFAR (OS-CFAR), a greatest of CFAR (GO-CFAR), a smallest of CFAR (SO-CFAR), and the like.

The estimator 480 may estimate information including a range, a velocity, and an azimuth of a target from the beat frequencies selected in the CFAR detector 470.

A chirp counter 490 may calculate a period of time for each chirp section in an FMCW to be transmitted by counting an internal clock, and inform a processor of a start point of each chirp based on an interrupt signal.

Also, the chirp counter 490 may inform the processor of a chirp number of the FMCW to, be transmitted by a transmitter.

Hereinafter, descriptions about example embodiments in which eight reception antennas, for example, antennas included in a multi-array antenna, are provided, four channels are supported by an ADC supports, and 16-bit sampling is performed will be provided.

Figure 5:
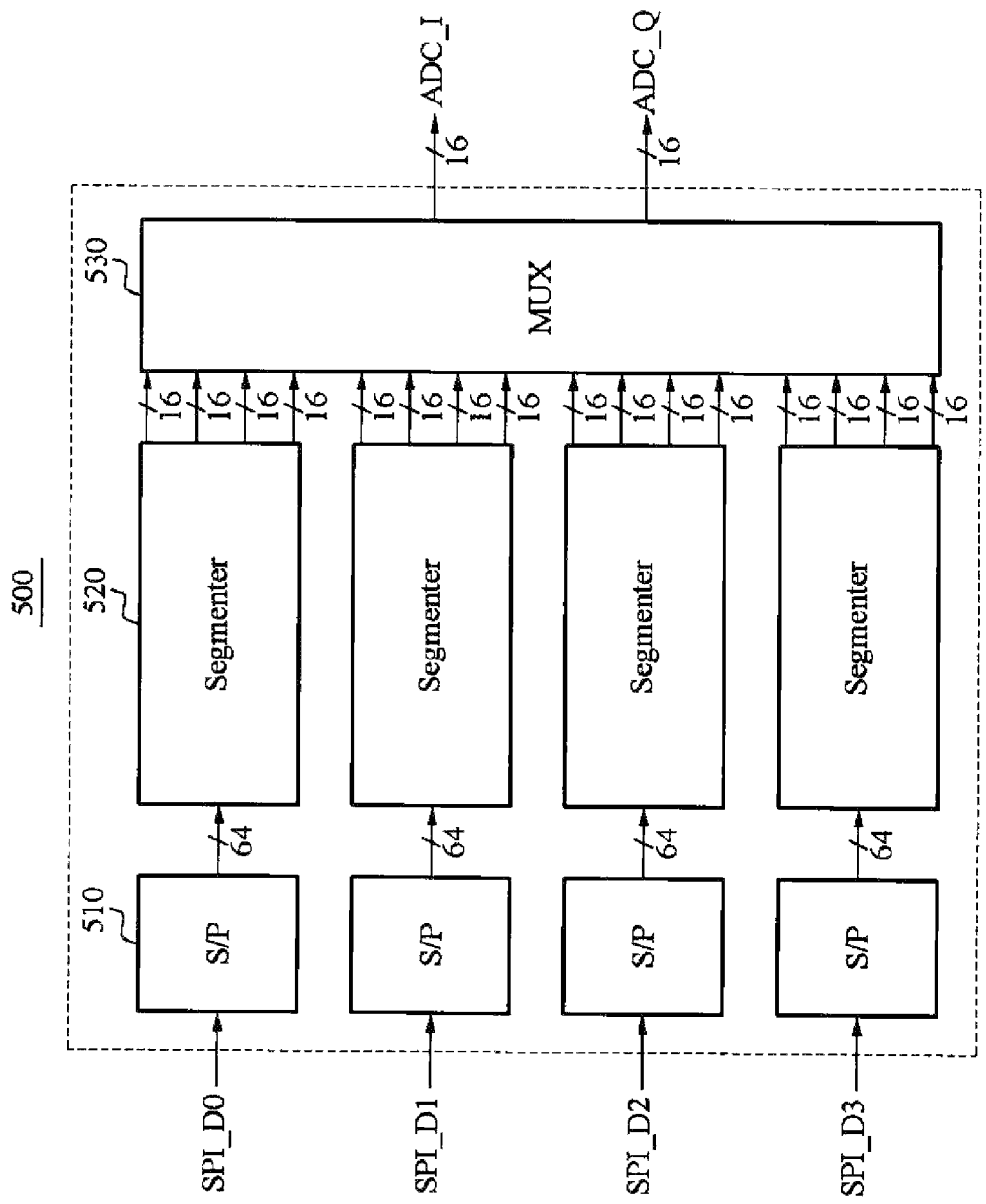
FIG. 5 is a block diagram illustrating a configuration of an analog-to-digital converter (ADC) symbol formatter in a target detection apparatus according to an example embodiment.

FIG. 5 is a block diagram illustrating a configuration of an ADC symbol formatter 500 in a target detection apparatus according to an example embodiment. In this example, the ADC symbol formatter 500 may correspond to the ADC symbol formatter 410 of FIG. 4.

Referring to FIG. 5, the ADC symbol formatter 500 according to an example embodiment may collect serial bits input from ADCs, segment the collected serial bits based on a unit of an ADC symbol, and output the ADC symbol through a rearrangement based on an arrangement order of antennas. In this example, serial bits SPI_D0, SPI_D1, SPI_D2, and SPI_D3 may be input from the ADCs to the ADC symbol formatter 500. The serial bits may be transmitted to symbol segmenters including a symbol segmenter 520 based on a unit of 64-bit data, corresponding to a 16-bit ADC symbol of the four channels, through serial to parallels (S/Ps) including an S/P 510.

Each 64-bit data may be segmented based on a 16-bit unit in the symbol segmenter 520 and then input to a multiplexer (MUX) 530. The ADC symbol formatter 410 may control the MUX 530 such that a corresponding 16-bit ADC symbol is output sequentially based on the arrangement order of the antennas. Hereinafter, related operations will be described with reference to FIG. 6.

Figure 6:
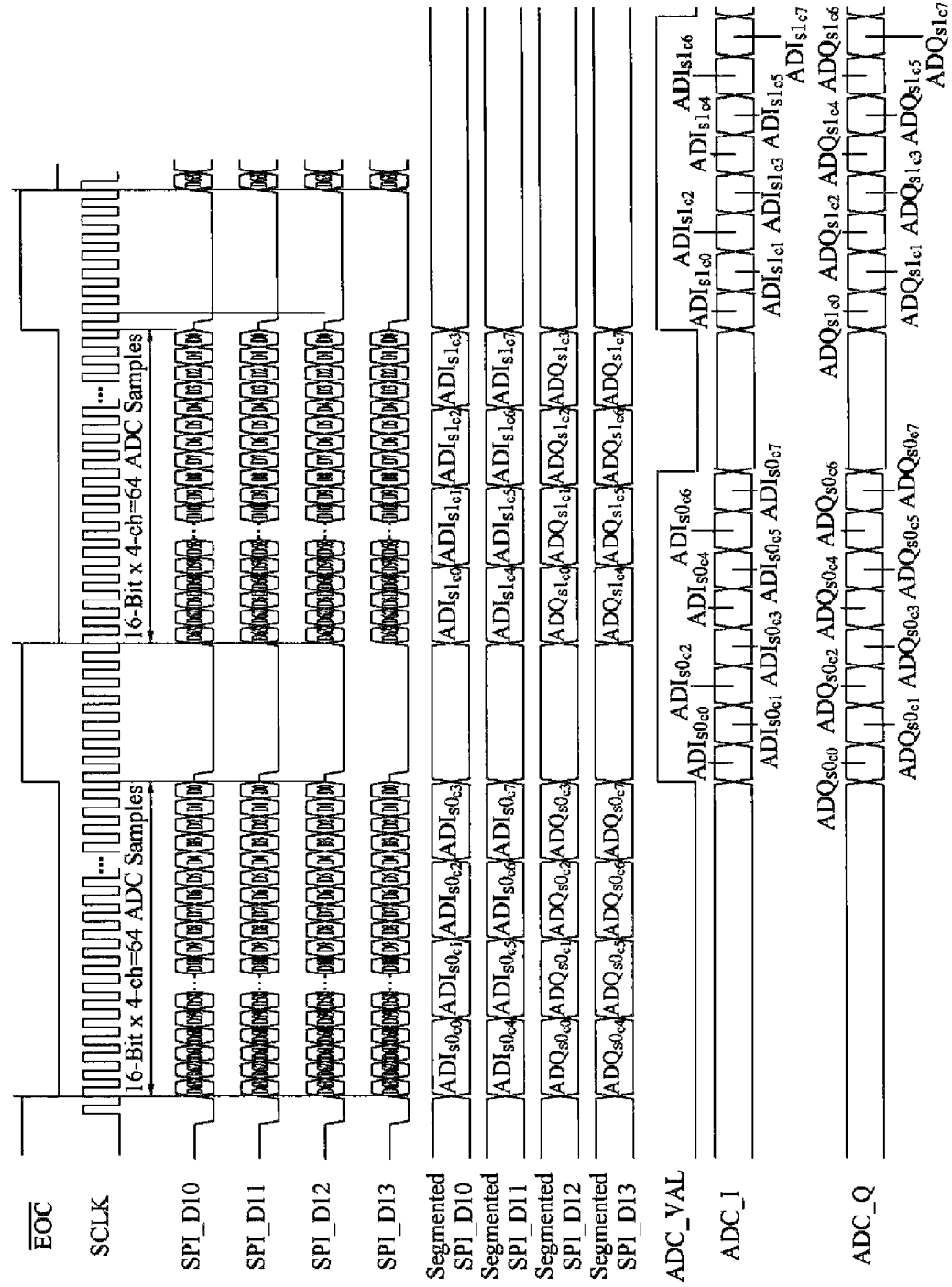
FIG. 6 is a diagram illustrating an operation of the ADC symbol formatter of FIG. 5.

FIG. 6 is a diagram illustrating an operation of the ADC symbol formatter 500 of FIG. 5.

Referring to FIG. 6, when four channels are to be process concurrently, four ADCs May be required to convert eight Q-symbols and eight I-symbols received from eight antennas into digital symbols.

In this example, the four ADCs may output SPI_DI0, SPI_DI1, SPI_DI2, and SPI_DI3, each being a 64-bit bitstream including D63 through D0 and corresponding to four 16-bit symbols. The symbol segmenters may segment SPI_DI0 into $ADI_{s0a0}$, $ADI_{s0a1}$, $ADI_{s0a2}$, and $ADI_{s0a3}$, may segment SPI_DI1 into $ADI_{s0a4}$, $ADI_{s0a5}$, $ADI_{s0a6}$, and $ADI_{s0a7}$, may segment SPI_DI2 into $ADQ_{s0a0}$, $ADQ_{s0a1}$, $ADQ_{s0a2}$, and $ADQ_{s0a3}$, and may segment SPI_DI3 into $ADQ_{s0a4}$, $ADQ_{s0a5}$, $ADQ_{s0a6}$, and $ADQ_{s0a7}$.

In $ADI_{s0a0}$, $s0$ denotes an ADC symbol 0, $a0$ denotes an antenna 0, and ADI denotes an I-channel symbol of an ADC. In $ADQ_{s0a4}$, ADQ denotes a Q-channel symbol of the ADC.

The MUX 530 may output $ADI_{s0a0}$, $ADI_{s0a1}$, $ADI_{s0a2}$, $ADI_{s0a3}$, $ADI_{s0a4}$, $ADI_{s0a5}$, $ADI_{s0a6}$, and $ADI_{s0a7}$, to a signal ADC_I sequentially, and output $ADQ_{s0a0}$, $ADQ_{s0a1}$, $ADQ_{s0a2}$, $ADQ_{s0a3}$, $ADQ_{s0a4}$, $ADQ_{s0a5}$, $ADQ_{s0a6}$, and $ADQ_{s0a7}$, to a signal ADC_Q sequentially. In this example, a signal ADC_VAL may indicate an interval in which the signal ADC_I and the signal ADC_Q have meaningful values.

Figure 7:
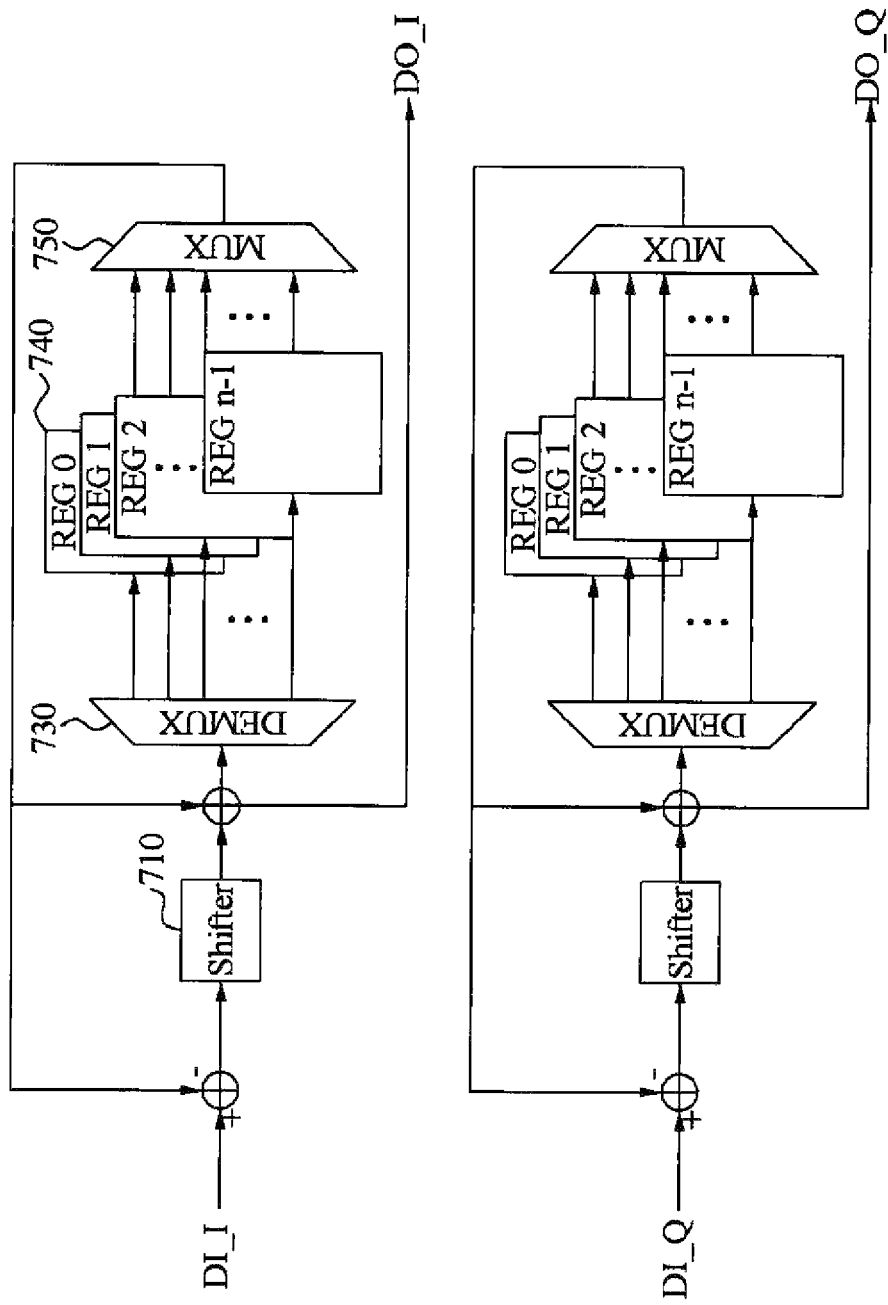
FIG. 7 is a diagram illustrating a configuration of a direct current (DC) offset remover in a target detection apparatus according to an example embodiment.

FIG. 7 is a diagram illustrating a configuration of a DC offset remover 700 in a target detection apparatus according to an example embodiment.

Referring to FIG. 7, the DC offset remover 700 according to an example embodiment may remove a DC offset component from a received signal of each antenna.

To estimate a DC offset component $V_o(n+1)$, a constant k may be multiplied by a average between an input $V_i(n)$ and an output $V_o(n)$, and a result of the multiplying may be accumulated such that the output $V_o(n)$ converges to a DC offset value after a predetermined time elapses. The aforementioned process may be expressed by Equation 4.

$$V_o(n+1)=V_o(n)+k(V_i(n)-V_o(n)) \quad \text{[Equation 4]}$$

In Equation 4, n is a natural number greater than or equal to 0.

Figure 8:
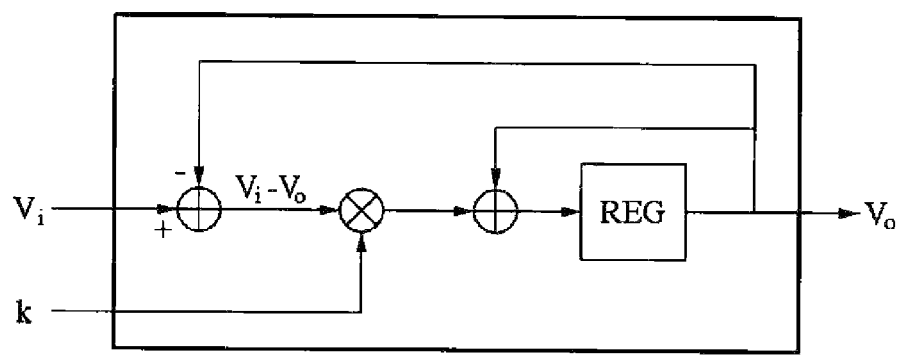
FIG. 8 is a diagram illustrating a hardware configuration of a DC offset estimator included in the DC offset remover of FIG. 7.

A hardware configuration of a DC offset estimator (not shown) using Equation 4 may be shown in FIG. 8.

ADC symbols may be input sequentially to the DC offset remover 700 in an order of antennas. The DC offset remover 700 may remove a DC offset from the received signal of each of the eight reception antennas through a time-sharing operation based on a hardware configuration shown in FIG. 7.

In the DC offset remover 700, each of internal registers including a register 0 740 may be allocated to a single antenna. The DC offset remover 700 may control a demultiplexer (DEMUX) 730 and an MUX 750 such that the ADC symbols of the antennas are connected to corresponding registers. For example, the DC offset remover 700 may allow the register 0 740 to be connected while an ADC symbol of an antenna 0 is being input, may allow a register 1 to be connected while an ADC symbol of an antenna 1 is being input, and may allow a register n to be connected while an ADC symbol of an antenna n is being input.

A shifter 710 may perform a shift right operation in lieu of a dividing operation with respect to a multiplier of 2.

FIG. 8 is a diagram illustrating a hardware configuration of a DC offset estimator according to an example embodiment.

The DC offset estimator for estimating a DC offset value by operating Equation 4 may be shown in FIG. 8.

In FIG. 8, a final output $V_o$ corresponds to an estimated DC offset value, $(V_i-V_o)$ corresponds to a value obtained by removing a DC offset from an input $V_i$, and k denotes a constant.

Figure 9:
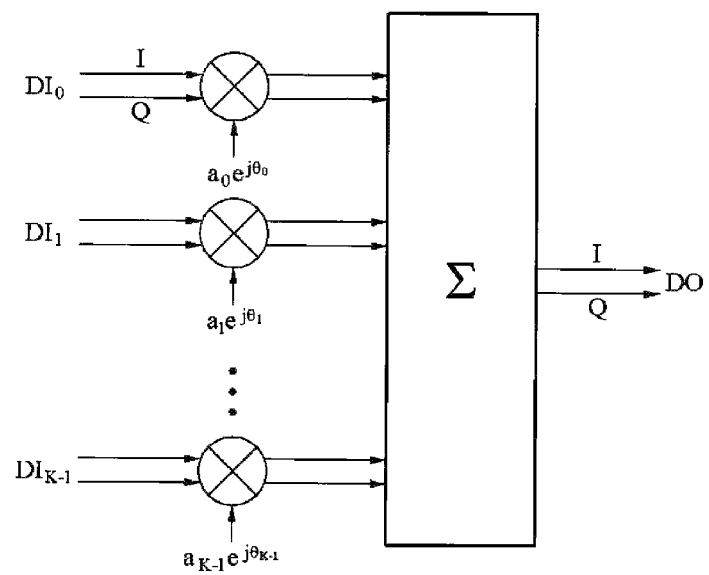
FIG. 9 is a diagram illustrating a configuration of a digital beam former (DBF) in a target detection apparatus according to an example embodiment.

FIG. 9 is a diagram illustrating a configuration of a DBF 900 in a target detection apparatus according to an example embodiment.

Referring to FIG. 9, the DBF 900 may combine signals received in various angles, for example, azimuths, through a digital operation of multiplying a phase for each signal received from a multi-array antenna, for example, a first window, and may output results of the combining for each beam.

In FIG. 9, $DI_n$ denotes a signal received from an $n^{th}$ antenna, and $a_k e^{j\theta_k}$ denotes a weighted value for a received signal of a $k^{th}$ antenna. In this example, $\{a_0 e^{j\theta_0}, a_1 e^{j\theta_1}, \ldots, a_{K-1} e^{j\theta_{K-1}}\}$ denote weighted values of antennas included in an antenna array configuration including K antennas. Based on a set of the weighted values, a beam output in a predetermined direction may be generated. Thus, weighted value corresponding to a number of beams to be generated by the DBF 900 may be required.

Figure 10:
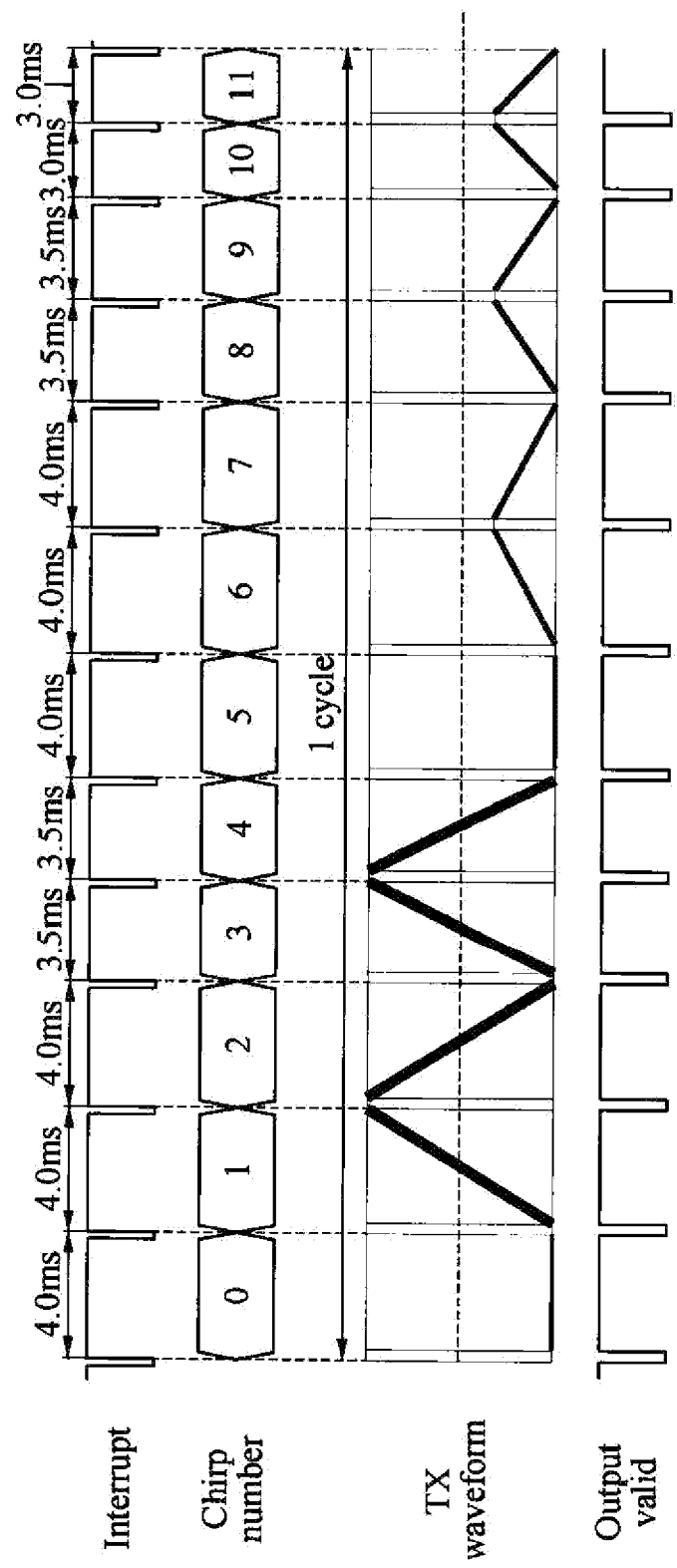
FIG. 10 is a diagram illustrating a relationship between a transmitter output and a chirp counter output of a radar signal processor according to an example embodiment.

FIG. 10 is a diagram illustrating a relationship between an output signal of a chirp counter and an output signal of an FMCW generator of a transmitter, which is generated based on a control of a processor according to an example embodiment.

Referring to FIG. 10, the chirp counter may calculate a length for each chirp of an FMCW to be transmitted, and output a chirp number of the FMCW to be transmitted by the transmitter and an active-low interrupt signal to the processor at a start point of each chirp section.

In this example, when the chirp number and the interrupt signal are received from a radar signal processor, the processor may generate control signals such that the FMCW generator of the transmitter outputs a corresponding chirp waveform.

The FMCW generator of the transmitter may output a transmission waveform based on a control of the processor and transmit an output valid signal indicating an output is valid, to the radar signal processor.

Figure 11:
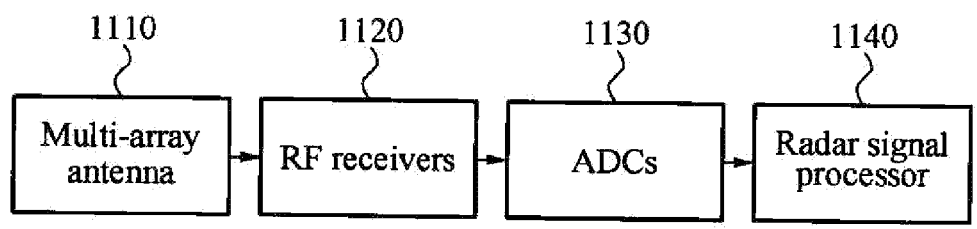
FIG. 11 is a block diagram illustrating a configuration of a receiver in a target detection apparatus according to an example embodiment.

FIG. 11 is a block diagram illustrating a configuration of a receiver 1100 in a target detection apparatus according to an example embodiment.

Referring to FIG. 11, the receiver 1100 in the target detection apparatus according to an example embodiment includes a multi-array antenna 1110, RF receivers 1120, ADCs 1130, and a radar signal processor 1140.

The multi-array antenna 1110 may include a plurality of antennas receiving signals reflected from a target.

The RF receivers 1120 may convert signals received from the antennas of the multi-array antenna 1110 into complex signals in a baseband.

The ADCs 1130 may convert the complex signals into digital signals.

The radar signal processor 1140 may select predetermined beat frequencies based on the digital signals, and estimate information on the target based on the selected beat frequencies.

The radar signal processor 1140 may include an ADC symbol formatter, a DC offset remover, a first window, a DBF, a second window, a fast Fourier transformer, a CFAR detector, an estimator, and a chirp counter. Descriptions with respect to each element of the radar signal processor 1040 will be omitted for increased clarity and conciseness because the descriptions provided with reference to the radar signal processor 400 of FIG. 4 are also applicable to each element of the radar signal processor 1140.

Figure 12:
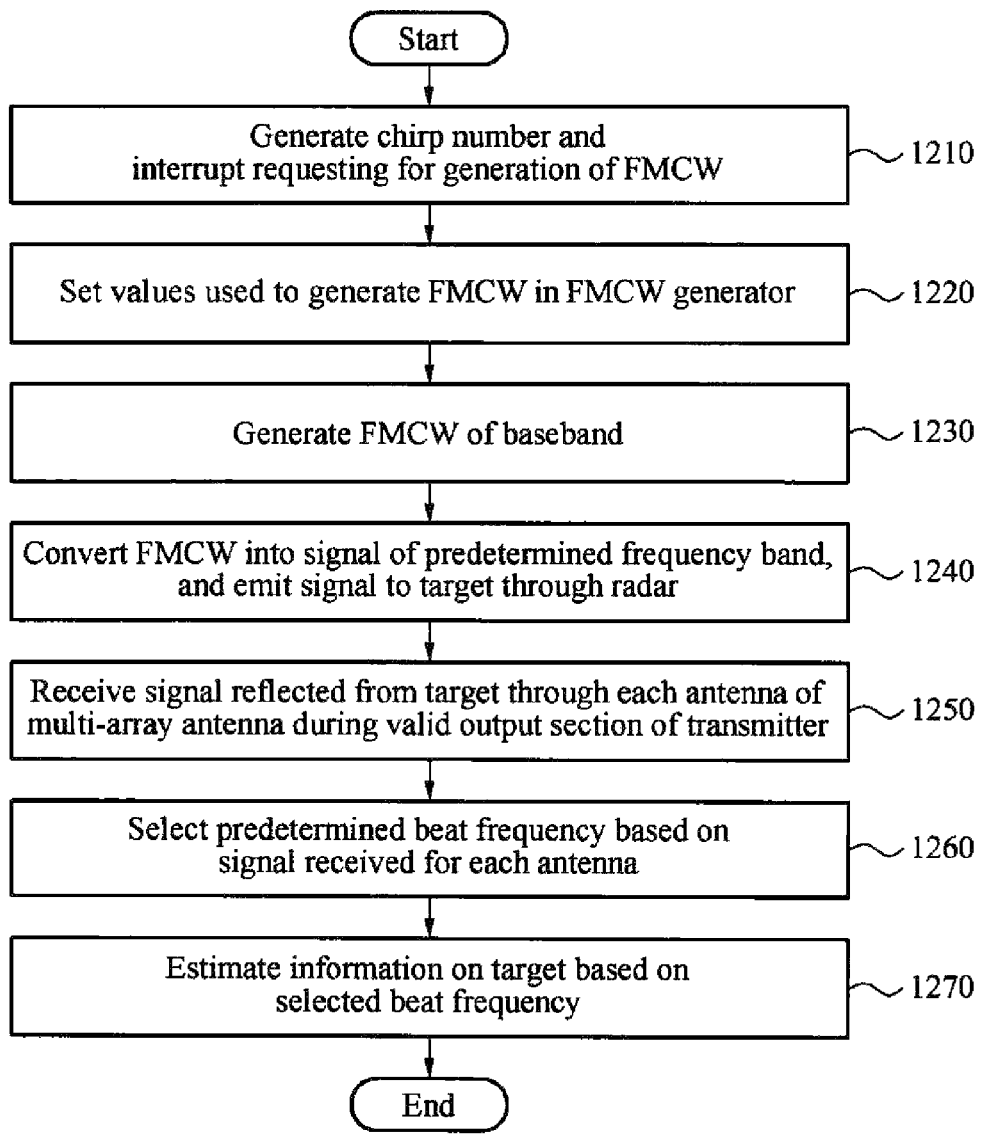
FIG. 12 is a flowchart illustrating a target detection method according to an example embodiment.

FIG. 12 is a flowchart illustrating a target detection method according to an example embodiment.

Referring to FIG. 12, in operation 1210, a target detection apparatus according to an example embodiment calculates a start point of each chirp section, and generates a chirp number to be generated in a transmitter and an interrupt requesting for a generation of an FMCW at the start point of each chirp section. Hereinafter, the target detection apparatus may also be referred to as a detection apparatus.

In operation 1220, the detection apparatus sets values used to generate the FMCW in an FMCW generator based on the chirp number and the interrupt indicating the start point of each chirp section.

In operation 1230, the detection apparatus generates an FMCW of a baseband.

In operation 1240, the detection apparatus converts the FMCW generated in operation 1230 into a signal of a predetermined frequency band, and emits the signal to a target through radar.

In operation 1250, the detection apparatus receives the signal reflected from the target through each antenna of a multi-array antenna during a valid output section of the transmitter.

In operation 1260, the detection apparatus selects a predetermined beat frequency based on the signal received through each antenna. Further, in operation 1260, the target detection apparatus may convert the signal received through each antenna of the multi-array antenna, into a complex signal of the baseband, and convert the complex signal into a digital signal. Subsequently, the target detection apparatus may select the predetermined beat frequency by processing the digital signal. Descriptions about a method of selecting the predetermined beat frequency in the detection apparatus will also be provided with reference to FIG. 13.

In operation 1270, the detection apparatus estimates information on the target based on the beat frequency selected in operation 1260. The information on the target may include, for example, a range, a velocity, and an azimuth of the target.

Figure 13:
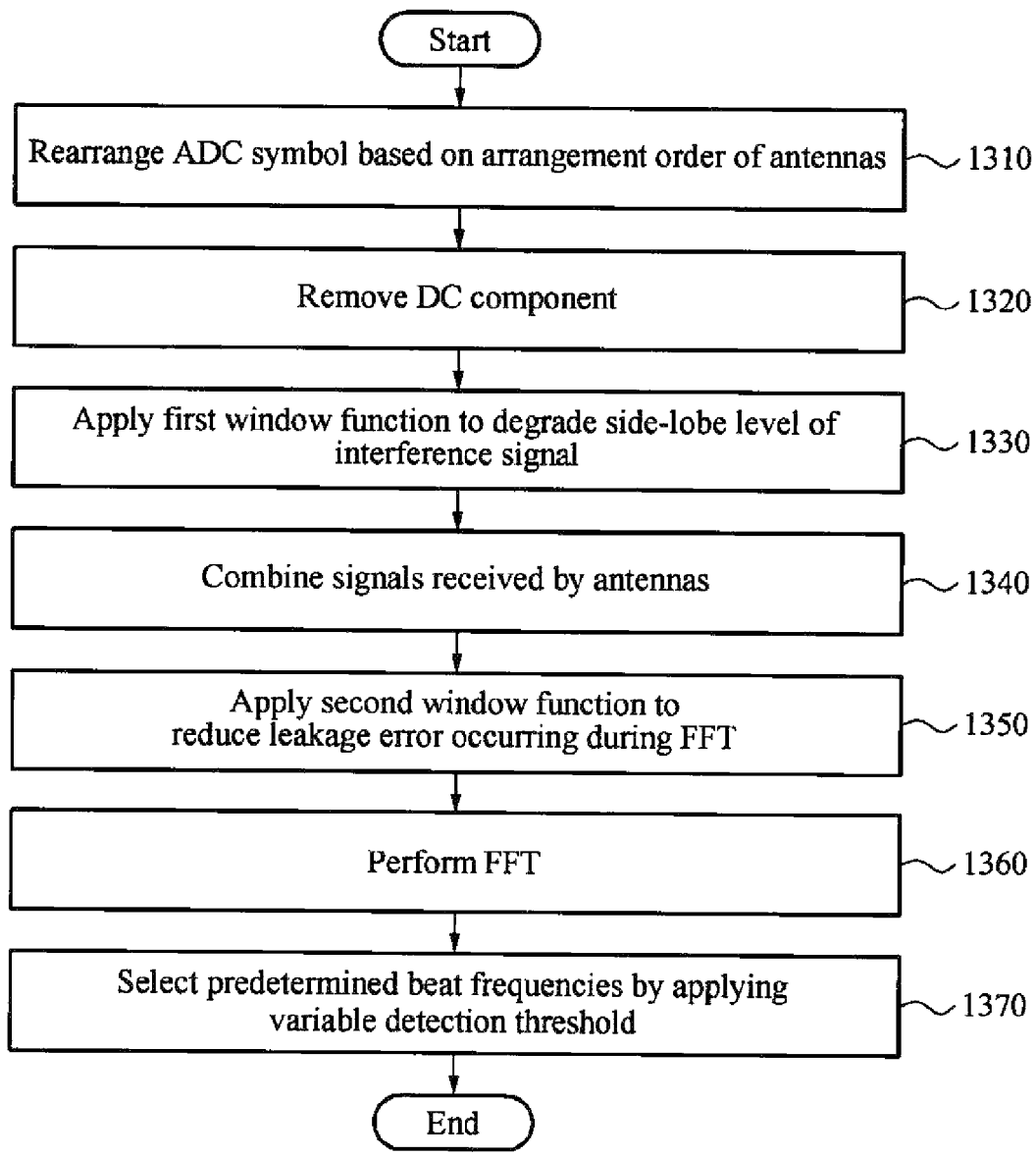
FIG. 13 is a flowchart illustrating a method of selecting a predetermined beat frequency in a target detection method according to an example embodiment.

FIG. 13 is a flowchart illustrating a method of selecting a predetermined beat frequency in a target detection method according to an example embodiment.

Referring to FIG. 13, in operation 1310, the target detection apparatus according to an example embodiment segments serial bits of digital signals based on a unit of an ADC symbol, and rearrange the ADC symbol based on an arrangement order of antennas.

In operation 1320, the target detection apparatus removes a DC component from the rearranged ADC symbol.

In operation 1330, the target detection apparatus applies a first window function to degrade a side-lobe level of an interference signal with respect to the ADC symbol from which the DC component is removed.

In operation 1340, the target detection apparatus combines signals received through the antennas based on a result of the applying of the first window function.

In operation 1350, the target detection apparatus applies a second window function to reduce a leakage error occurring during an FFT with respect to the signals combined in operation 1340.

In operation 1360, the target detection apparatus performs the FFT based on a result of the applying of the second window function.

In operation 1370, the target detection apparatus selects predetermined beat frequencies by applying a variable detection threshold to a result of the performing of the FFT.

According to an aspect of the present invention, it is possible to provide a target detection apparatus for supporting a target detection using short range radar and a target detection using long range radar.

According to another aspect of the present invention, it is possible to provide a target detection apparatus for providing an outstanding performance of detecting in an environment with noise and clutter.

According to still another aspect of the present invention, it is possible to configuring elements of a radar device based on a system on chip (SoC), thereby reducing a size and power consumption of a target detection apparatus.

The methods according to the above-described embodiments may be recorded, stored, or fixed in one or more non-transitory computer-readable media that includes program instructions to be implemented by a computer to cause a processor to execute or perform the program instructions.

The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A target detection apparatus comprising:
   a transmitter to generate a frequency modulated continuous waveform (FMCW) of a baseband, to convert the FMCW into a signal of a predetermined frequency band, and to emit the converted signal to a target through radar;
   a receiver to receive the signal reflected from the target through each antenna of a multi-array antenna, and to estimate information on the target based on the signal received through respective one of the multi-array antenna; and
   a processor to control operations of the transmitter and the receiver, the control operations being performed by calculating, by the processor, a start point of a valid radar reception signal transmitted from each antenna of a multi-array antenna, the start point being calculated based on an output valid signal provided from the transmitter as a synchronization signal, wherein
   the processor is configured to receive a number of a chirps to be transmitted by the transmitter and to receive an interrupt signal indicating a start point of each chirp section of the FMCW from the receiver and to provide a control signal allowing the transmitter to generate the FMCW of a corresponding section.

2. The apparatus of claim 1, wherein the transmitter comprises:
   an FMCW generator to generate the FMCW of the baseband; and
   a radio frequency (RF) transmitter to convert the FMCW into the signal of the predetermined frequency band, and to emit the signal through the radar.

3. The apparatus of claim 2, wherein the FMCW generator generates the FMCW of the corresponding section under a control of the processor and transfers an output valid signal indicating that the FMCW of the corresponding section is being outputting, to the radar signal processor.

4. The apparatus of claim 1, wherein the radar signal processor informs the processor of the start point of each chirp section in the FMCW as an interrupt, and informs the FMCW generator of a number of the chirps to be transmitted by the transmitter.

5. The apparatus of claim 1, wherein all or part of functions of the radar signal processor is processed by the processor through software.

6. The apparatus of claim 1, wherein a first waveform for detecting a short range target and a second waveform for detecting a long range target occur sequentially during one cycle in the FMCW.

7. The apparatus of claim 6, wherein the first waveform comprises five chirps, each of the five chirps having a different time-based frequency change inclination.

8. The apparatus of claim 6, wherein the second waveform comprises seven chirps, each of the seven chirps having a different time-based frequency change inclination.

9. The apparatus of claim 1, wherein the receiver calculates a beat frequency for each segment based on the signal received through each antenna, and estimates information comprising at least one of a range, a velocity, and an azimuth of the target.

10. The apparatus of claim 1, wherein the receiver comprises:
a multi-array antenna comprising a plurality of antennas receiving signals reflected from the target;
RF receivers to convert the signals received through the antennas of the multi-array antenna, into complex signals of the baseband;
analog-to-digital converters (ADCs) to convert the complex signals into digital signals; and
a radar signal processor to process the digital signals and estimate information on the target.

11. The apparatus of claim 10, wherein each of the RF receivers multiplies the signal of the predetermined frequency band provided by the transmitter, by the signals received by the respective antennas, and converts results of the multiplying into the complex signals of the baseband.

12. The apparatus of claim 10, wherein a number of ADCs is disposed proportional to a number of antennas included in the multi-array antenna.

13. The apparatus of claim 10, wherein the radar signal processor comprises:
an ADC symbol formatter to segment serial bits input from the ADCs based on a unit of an ADC symbol, and to output the ADC symbol through a rearrangement based on an arrangement order of the antennas;
a direct current (DC) offset remover to remove a DC component from the rearranged ADC symbol;
a first window to apply a window function to degrade a side-lobe level of an interference signal with respect to the ADC symbol from which the DC component is removed;
a digital beam former (DBF) to combine the signals received through the antennas to be signals received in a predetermined direction through a digital operation based on an output signal of the first window, and output the combined signals for each beam;
a second window to apply a window function to reduce a leakage error occurring during a fast Fourier transform (FFT) performed on the combined signals;
a fast Fourier transformer to perform the FFT on an output signal of the second window;
a constant false alarm rate (CFAR) detector to select predetermined beat frequencies by applying a variable detection threshold to an output signal of the FFT;
an estimator to estimate information comprising a range, a velocity, and an azimuth of the target from the selected beat frequencies; and
a chirp counter to calculate a chirp number and a start point of each chirp section in the FMCW.

14. The apparatus of claim 13, wherein the DBF multiplies the output signal through each antenna of the first window by a preset weighted value and combines a signal received in a predetermined direction through a phase rotation.

15. A receiver in a target detection apparatus, the receiver comprising:
a multi-array antenna comprising a plurality of antennas receiving signals reflected from a target;
radio frequency (RF) receivers to convert the signals received through the antennas of the multi-array antenna, into complex signals of a baseband;
analog-to-digital converters (ADCs) to convert the complex signals of the baseband into digital signals; and
a radar signal processor to calculate predetermined beat frequencies based on the digital signals, to calculate a start point of a valid radar reception signal transmitted from each antenna of a multi-array antenna, the start point being calculated based on an output valid signal provided from a transmitter as a synchronization signal, and to estimate information of a target based on the calculated beat frequencies, and the radar signal processor to receive a number of a chirps to be transmitted by the transmitter, to receive an interrupt signal indicating a start point of each chirp section of the FMCW from the receivers and to provide a control signal allowing the transmitter to generate the FMCW of a corresponding section,
the beat frequencies being calculated by
converting the signal received through each antenna of the multi-array antenna, into complex signals of the baseband,
converting the complex signals of the baseband into digital signals, and
selecting the predetermined beat frequencies.

16. A target detection method comprising:
generating an interrupt requesting for a generation of a frequency modulated continuous waveform (FMCW);
setting values for use in the generation of the FMCW in an FMCW generator;
generating an FMCW of a baseband;
converting the FMCW into a signal of a predetermined frequency band and emitting the signal to a target through radar;
receiving the signal reflected from the target, through each antenna of a multi-array antenna during a valid output section of a transmitter;
calculating predetermined beat frequencies based on the signal received through each antenna and calculating a start point of a valid radar reception signal transmitted from each antenna of a multi-array antenna, the start point being calculated based on an output valid signal as a synchronization signal; and
receiving a number of a chirps to be transmitted and receiving an interrupt signal indicating a start point of each chirp section of the FMCW and providing a control signal allowing the transmitter to generate the FMCW of a corresponding section,
the predetermined beat frequencies being calculated by
converting the signal received into complex signals of the baseband, converting the complex signals of the baseband into digital signals, and selecting the predetermined beat frequencies; and estimating information on the target based on the calculated beat frequencies.

17. The method of claim 16, wherein the selecting comprises:

segmenting serial bits of the digital signals based on a unit of an analog-to-digital converter (ADC) symbol, and rearranging the ADC symbol based on an arrangement order of antennas;

removing a direct current (DC) component from the rearranged ADC symbol;

applying a first window function to degrade a side-lobe level of an interference signal with respect to the ADC symbol from which the DC component is removed;

combining signals received through each antenna based on a result of the applying of the first function;

applying a second window function to reduce a leakage error occurring during a fast Fourier transform (FFT) performed on the combined signals; performing the FFT on a result of the applying of the second window; and selecting predetermined beat frequencies by applying a variable detection threshold to a result of the performing.

* * * * *